S. S. WILLIAMS.
RESILIENT WHEEL.
APPLICATION FILED AUG. 19, 1910
991,923.
Patented May 9, 1911.
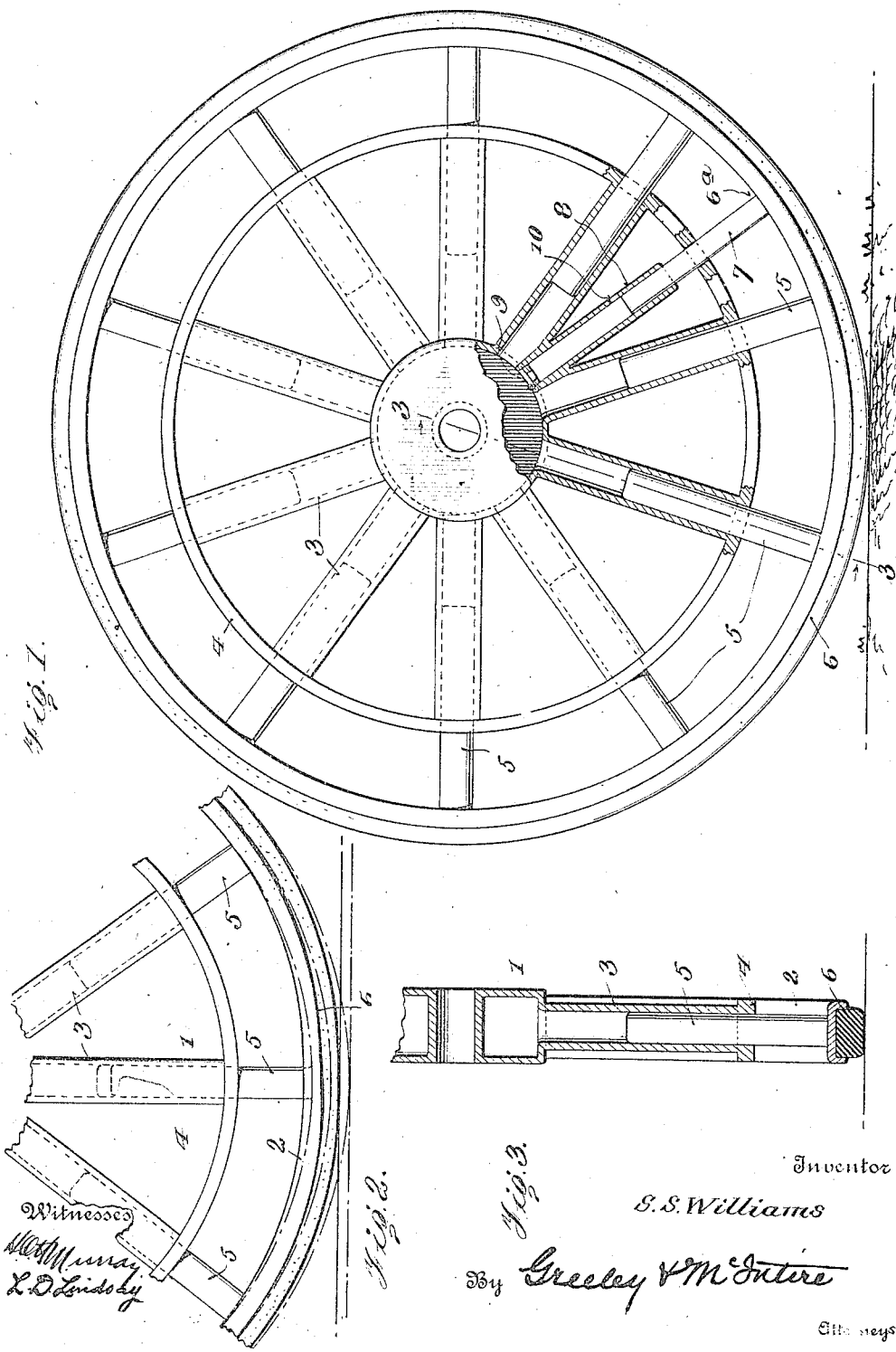
Inventor
S. S. Williams
By Greeley & McIntire
Attorneys

UNITED STATES PATENT OFFICE.

SEYMOUR S. WILLIAMS, OF KANSAS CITY, MISSOURI.

RESILIENT WHEEL.

991,923.

Specification of Letters Patent.

Patented May 9, 1911.

Application filed August 19, 1910. Serial No. 577,961.

*To all whom it may concern:*

Be it known that I, SEYMOUR S. WILLIAMS, a citizen of the United States, residing at Kansas City, in the county of Jackson and State of Missouri, have invented certain new and useful Improvements in Resilient Wheels; and I do hereby declare the following to be a full, clear, and exact description of the invention, such as will enable others skilled in the art to which it appertains to make and use the same.

This invention relates to improvements in resilient wheels and more especially to that class where air under pressure is utilized to effect the cushioning action when load pressure is applied.

A further object of the invention is to provide automatic means whereby a constant supply of air is forced into the wheel parts permitting of an even and effective cushioning action.

Another object of the invention is to provide a wheel the outer rim of which will be sufficiently resilient to permit of the separate action of each plunger or spoke to effect a cushioning action.

The invention also relates to the specific details of construction and the arrangement of parts to be hereinafter described, and particularly pointed out in the claim.

In the accompanying drawings:—Figure 1 is a side elevation of the wheel, parts being shown in section. Fig. 2 is a detail elevation showing the wheel subjected to shock and the relation of the rim and plunger therewith. Fig. 3 is a detail vertical section on line 3—3 of Fig. 1.

Referring now to the drawings in which like reference numerals indicate similar parts, A is the wheel comprising two sections, an inner hub section provided with the usual axle opening and an outer resilient rim section 2, the latter yieldably operating longitudinally of the aforesaid section.

The hub consists of an annular air chamber, partitioned from the axle opening, and provided with radially disposed tubular spokes 3 communicating with said chamber, and connected at their outer ends by a rim 4. The spokes 3 extending from the hub are circular in cross section and their inner walls are ground and constitute separate sleeves or cylinders for a purpose hereinafter described. Co-acting with these sleeves or cylinders are plungers 5 which are carried by the outer resilient rim 2. The plungers 5 are ground to fit the ground sleeves and extend more than half way into the sleeves or cylinders and in so doing assure very little escape of air.

Protruding inwardly from the outer resilient rim section 2, is a plunger 7 adapted to reciprocate in a corresponding ground sleeve or cylinder 8, the latter at its ends being provided with a check valve 9, communicating with the chambered hub. The sleeve 8 is apertured at 10 normally just above or in alinement with the innermost end of the plunger 7. This affords a constant atmosphere pressure with the sleeve 8, thereby permitting of a constant source of air supply when the plunger 7 is operated.

I do not wish to limit myself to the exact construction of air supply, as any other convenient mechanism such as an ordinary hand pump or the like will serve the same purpose.

A sufficient lubricant is allowed to supply the several plungers, thus always compensating for all leakage and affording an even operation.

The operation of the wheel is as follows: The chambered hub is filled with air under pressure combined with the lubricant. The plungers co-acting with the several cylinder or sleeve spokes are so disposed that as that part of the resilient rim directly beneath each plunger 5 is brought in contact with the ground, said plunger is caused to operate longitudinally within its respective cylinder or sleeve; ample movement being afforded through the resiliency of the rim by which it is carried; between the adjoining plungers at either side of the reciprocating plunger. This operation is repeated as each plunger by its intermediate resilient rim section contacts with the ground, thus establishing an even cushioning action throughout the circumferential portion of the wheel. When the plunger 7 by its rim section is brought into action a new charge or supply of air is automatically injected to the chambered hub, thus always keeping a constant pressure within said chamber to resist the shocks as hereinbefore described. Thus it will be seen that an operative even cushioning action is obtained sufficiently ample to withstand the shocks to which the wheel may be subjected.

Having thus described my invention what I claim as new and desire to secure by Letters Patent is:—

In a resilient wheel, the combination of a chambered hub, tubular spokes projecting radially therefrom and carrying a rim, plungers slidably mounted in the tubular spokes, a resilient outer rim secured to the plungers, a cylinder leading from the chamber of the hub and located between a pair of spokes, a piston operative in the cylinder, the piston extending through an opening in the rim of the wheel and attached to the outer resilient rim, and the cylinder provided with an aperture for admitting air arranged below the end of the piston when said piston is in its normal position, whereby the aperture is adapted to be closed by the inward movement of the outer rim and piston to pump air into the chambered hub.

In testimony whereof I affix my signature in presence of two witnesses.

SEYMOUR S. WILLIAMS.

Witnesses:
 HORACE PRATT,
 J. F. BURKHARDT.